Sept. 6, 1932.   G. I. HINSVARK   1,876,503
BROODER HOUSE FOR PIGS
Filed April 1, 1930   2 Sheets-Sheet 1
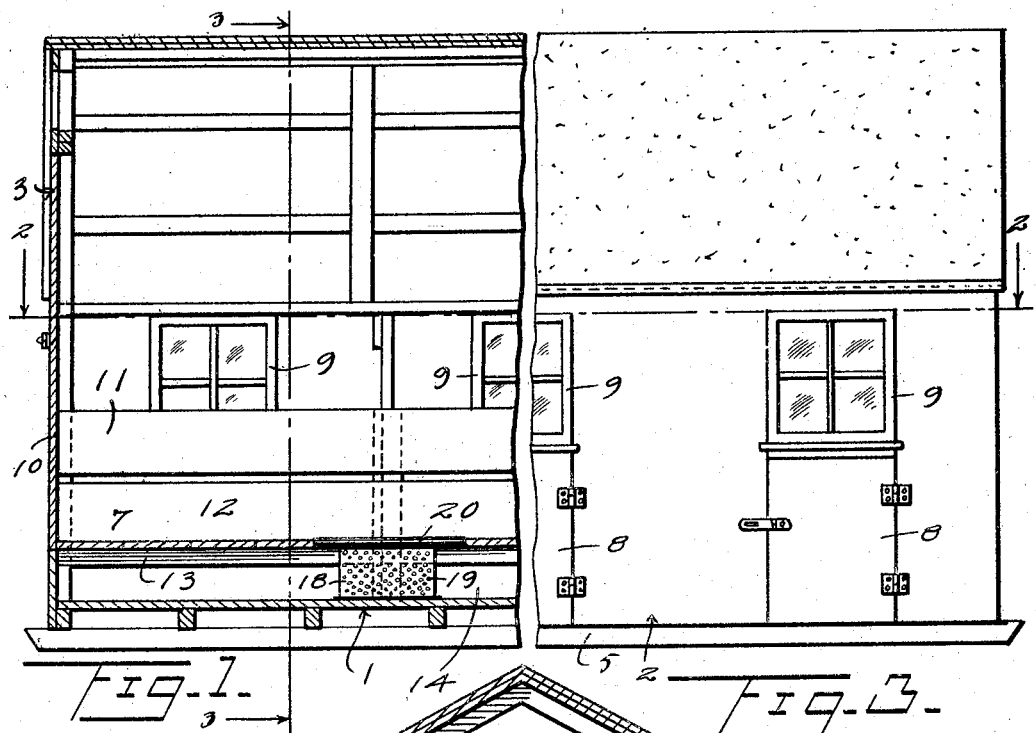
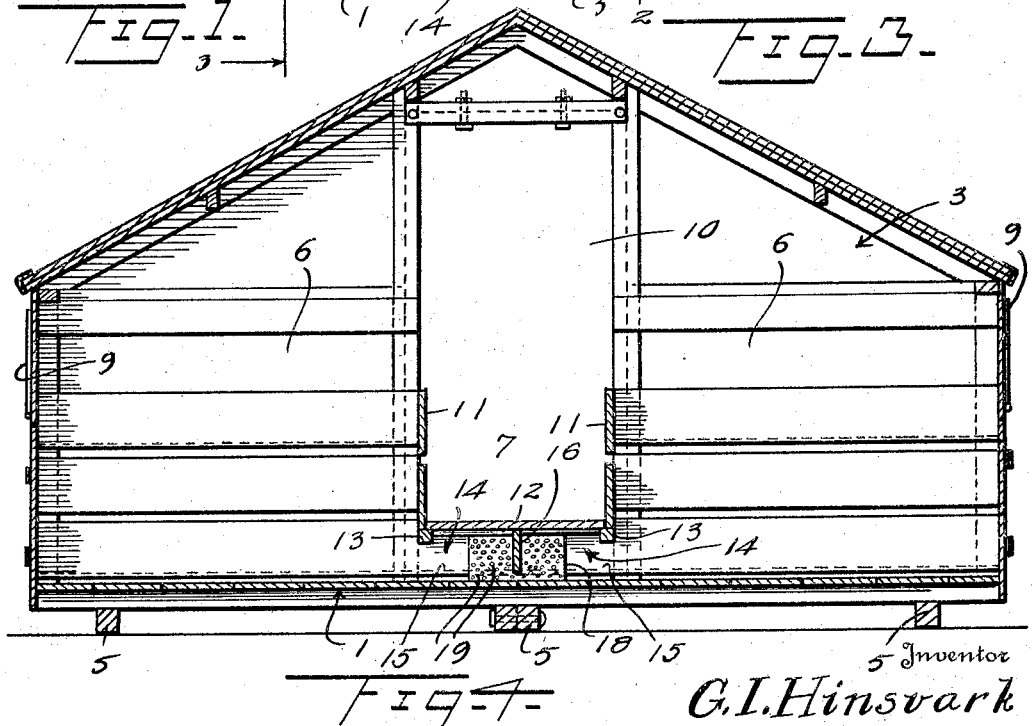

Sept. 6, 1932.    G. I. HINSVARK    1,876,503
BROODER HOUSE FOR PIGS
Filed April 1, 1930    2 Sheets-Sheet 2

Inventor
G. I. Hinsvark
By Watson E. Coleman
Attorney

Patented Sept. 6, 1932

1,876,503

UNITED STATES PATENT OFFICE

GEORGE I. HINSVARK, OF RENNER, SOUTH DAKOTA

BROODER HOUSE FOR PIGS

Application filed April 1, 1930. Serial No. 440,793.

This invention relates to brooder houses for pigs, and has for one of its objects to provide a house of this character which shall embody a series of stalls at each side of the longitudinal center thereof, and an alleyway extending throughout the entire length thereof between the series of stalls, to the end that the sows occupying the stalls may be conveniently fed.

The invention has for a further object to provide a brooder house of the character stated wherein the alleyway shall be arranged above the floor of the house and the space therebeneath divided into compartments in which only the young pigs may enter for rest and play, and wherein the respective play and rest compartments shall communicate only with the respective stalls so as to prevent the intermingling of the broods.

The invention has for a further object to provide a brooder house of the character stated which shall embody heaters, each so arranged with respect to a group of the rest and play compartments as to effectively heat them and the stalls with which they communicate, and which shall embody shields so related to the heaters as to prevent the young pigs from being injured thereby.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in vertical section and partly in side elevation of a brooder house constructed in accordance with my invention;

Figure 3 is a sectional view taken on the vertical plane indicated by the line 3—3 of Figure 1, and Figure 4 is a sectional view through a portion of one of the heater covers.

Figure 2:
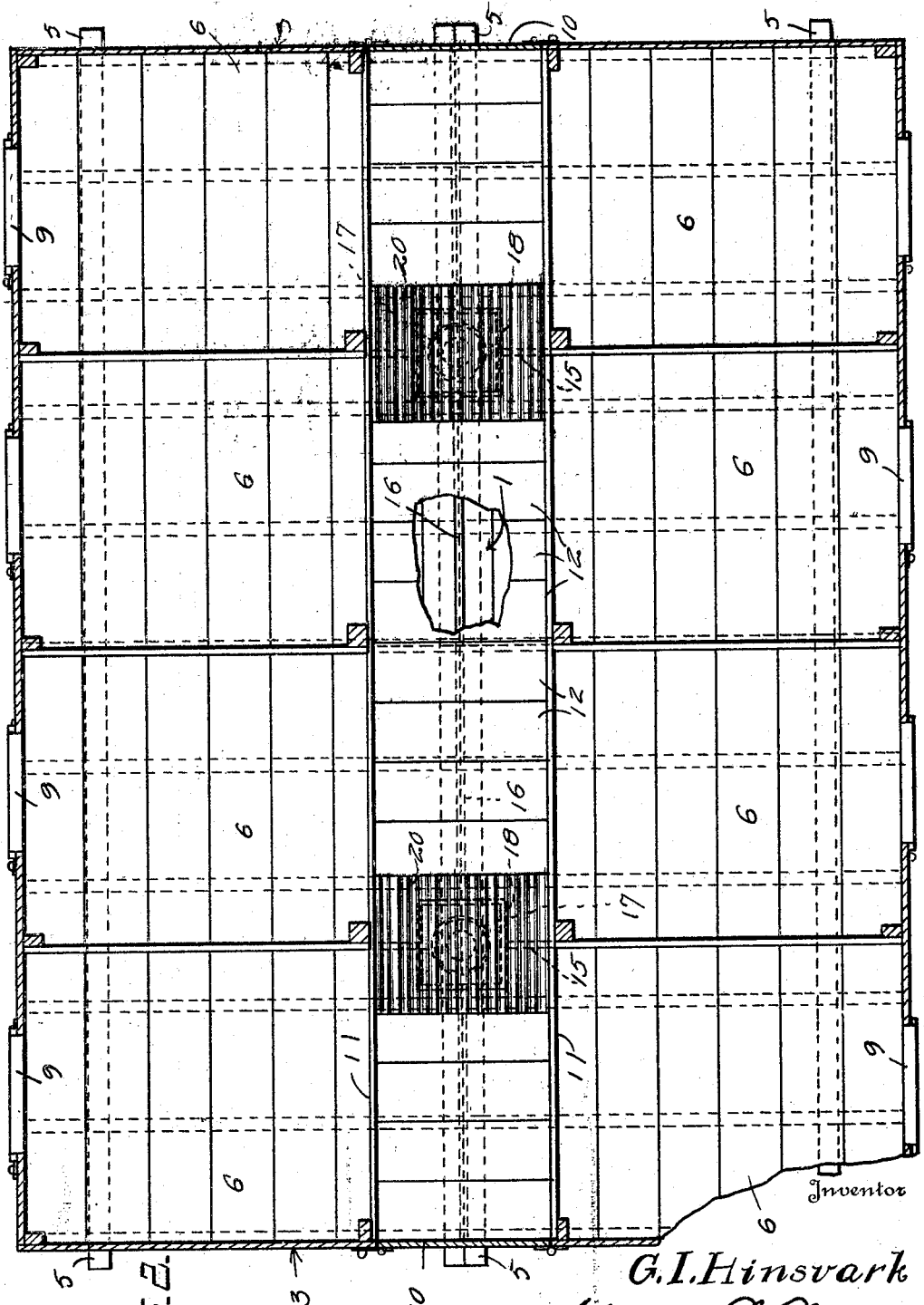
Figure 2 is a sectional view taken on the horizontal plane indicated by the line 2—2 of Figure 1.

Referring in detail to the drawings, 1 designates the floor, 2 the side walls, 3 the end walls and 4 the roof of the brooder house. The brooder house may be of any desired or required height, length and width, and it may be mounted upon any suitable foundation which is illustrated as consisting of sills 5 extending in the direction of the length of the house. The floor, walls and roof of the brooder house may be made of wood or other suitable material or materials, and the roof may be covered with slate or the like.

The brooder house is provided at each side of its longitudinal center with a series of stalls 6, and is provided between the stalls with an alleyway 7. The brooder house is provided in its side walls with doors 8 and windows 9 which are arranged at the outer ends of the stalls 6. The doors 8 are located below the windows 9, and extend upwardly from the floor 1 so as to permit sows to be readily placed in and removed from the stalls.

The alleyway 7 extends from one of the end walls 3 to the other, and these walls are provided with doors 10 so as to permit the alleyway to be entered from either end of the brooder house. The alleyway 7 comprises sides 11 which close the inner ends of the stalls 6, and floor boards 12 which are spaced upwardly from the floor 1 and are removably supported by beams 13. The space between the floor 1 and floor boards 12 is divided into compartments 14 by transverse partitions 15 and longitudinal partitions 16. The rest and play compartments 14 are similar as to size and the respective compartments communicate with the inner ends of the respective stalls 6 so as to permit the young pigs to enter them from the stalls for rest and play. The height of the rest and play compartments 14 is not sufficient to permit the sows to enter the compartments, and in view thereof, all danger of the young pigs being accidentally injured by the sows, when the former are in compartments, is obviated.

Each group or opposing pairs of the stalls 6 is heated by a single stove 17 which may be of any well known or appropriate construction. Each stove 17 is arranged in a box or casing 18 which is located centrally of each group of the rest and play compartments 14, and extends into the compartments. The sides of the casings 18 are perforated, as shown at 19, to permit the heat from the stoves 17 to enter the rest and play compartments 14. The tops 20 of the casings 18 are removably supported by the beams 13, and consist of alternately arranged plys of corrugated sheet metal and sheets of asbestos, the former being designated 21 and the latter 22. The tops 20 fully close the upper sides of the casings 18 so as to cause all the heat generated by the stoves 17 to pass through the perforations 19 into the rest and play compartments 14.

It should be apparent from the foregoing description, taken in connection with the accompanying drawings, that the arrangement of the alleyway 7 with respect to the stalls 6 permits the sows occupying the stalls to be conveniently fed and permits the stalls to be provided at their inner ends with compartments into which only the young pigs may enter for rest and play, that the arrangement of the stoves 17 permits each to efficiently heat a group of the stalls and the rest and play compartments, that the play and rest compartments may be readily cleaned after the removal of the floor boards 12 of the alleyway, and that the stoves will be readily accessible for any attention required thereby after the removal of the covers 20 of the casings 18.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

A brooder house comprising a series of stalls arranged at opposite sides of the center thereof, an alleyway located between the series of stalls and having sides closing the inner ends of the stalls and located above the floors of the stalls, beams extending longitudinally of the sides near the lower portions of the latter, boards mounted on the beams and constituting a portion of the floor of the alleyway, right angularly related partitions dividing the spaces between the stall and the alleyway floors into rest and play compartments communicating with the stalls, a perforated casing located between the adjacent ends of the partitions and having portions thereof extending into the compartments, a heater in the casing, and an imperforate cover for the upper side of the casing consisting of alternate layers of corrugated sheet metal and asbestos and removably mounted on the beams and constituting the remaining portion of the floor of the alleyway.

In testimony whereof I hereunto affix my signature.

GEORGE I. HINSVARK.